(12) United States Patent  
Cain

(10) Patent No.: US 8,561,646 B2
(45) Date of Patent: Oct. 22, 2013

(54) SYSTEM AND METHODS FOR MULTIPLE SERVICE LINE PLUG DEPLOYMENT

(75) Inventor: John A. Cain, Fairplay, CO (US)

(73) Assignee: WPW, LLC, Breckenridge, CO (US)

( * ) Notice: Subject to any disclaimer, the term of this patent is extended or adjusted under 35 U.S.C. 154(b) by 158 days.

(21) Appl. No.: 12/977,736

(22) Filed: Dec. 23, 2010

(65) Prior Publication Data

US 2011/0155273 A1 Jun. 30, 2011

Related U.S. Application Data

(60) Provisional application No. 61/289,806, filed on Dec. 23, 2009.

(51) Int. Cl.
*F16L 55/10* (2006.01)

(52) U.S. Cl.
USPC .................................. 138/89; 138/92; 138/94

(58) Field of Classification Search
USPC .......................................... 138/89, 92, 94, 98
See application file for complete search history.

(56) References Cited

U.S. PATENT DOCUMENTS

| | | | |
|---|---|---|---|
| 3,532,132 A | 10/1970 | Rubenstein | |
| 4,893,389 A | 1/1990 | Allen et al. | |
| 4,968,934 A * | 11/1990 | Robinet et al. | 324/207.22 |
| 5,074,365 A | 12/1991 | Kuckes | |
| 5,167,258 A | 12/1992 | Rice | |
| 5,333,649 A * | 8/1994 | Shimokawa et al. | 138/89 |
| 5,485,089 A | 1/1996 | Kuckes | |
| 5,532,598 A | 7/1996 | Clark, Jr. et al. | |
| 5,566,719 A | 10/1996 | Kamiyama et al. | |
| 5,577,528 A | 11/1996 | Saha et al. | |
| 6,024,515 A | 2/2000 | Konwinski et al. | |
| 6,085,794 A | 7/2000 | Kamiyama et al. | |
| 6,158,473 A | 12/2000 | Kamiyama et al. | |
| 6,167,913 B1 | 1/2001 | Wood | |
| 6,206,049 B1 * | 3/2001 | Ward | 138/98 |
| 6,688,337 B2 * | 2/2004 | Ward | 138/98 |
| 6,807,987 B2 * | 10/2004 | Hill et al. | 138/104 |
| 6,917,176 B2 | 7/2005 | Schempf et al. | |
| 7,131,791 B2 | 11/2006 | Whittaker et al. | |
| 7,669,614 B2 | 3/2010 | Cohen | |
| 7,841,366 B2 | 11/2010 | Bryant et al. | |
| 2001/0000874 A1 | 5/2001 | Stephens | |
| 2001/0029989 A1 | 10/2001 | Paz | |
| 2003/0047226 A1 * | 3/2003 | Hill et al. | 138/104 |
| 2005/0092382 A1 | 5/2005 | Muhlin | |
| 2008/0178403 A1 | 7/2008 | Bryant et al. | |
| 2008/0213047 A1 | 9/2008 | Bryant et al. | |
| 2009/0272452 A1 | 11/2009 | Cain et al. | |
| 2011/0155273 A1 | 6/2011 | Cain | |

OTHER PUBLICATIONS

PCT International Search Report and Written Opinion issued in PCT/US2009/032784, mailed Apr. 20, 2009, 9 pages.

* cited by examiner

*Primary Examiner* — Patrick F Brinson
(74) *Attorney, Agent, or Firm* — Faegre Baker Daniels LLP

(57) ABSTRACT

Embodiments of the present invention include a system for locating and restoring service lines during pipeline restoration. According to some embodiments of the present invention, a system for service line plug transport and dispensing includes at least one magazine tray including a plurality of service line plugs and a plug advancement mechanism for pushing at least one of the plurality of service line plugs off of the magazine tray and onto an applicator fitting. According to embodiments of the present invention, the applicator fitting includes a magnet configured to interact with a magnet inside the at least one of the plurality of service line plugs.

18 Claims, 20 Drawing Sheets

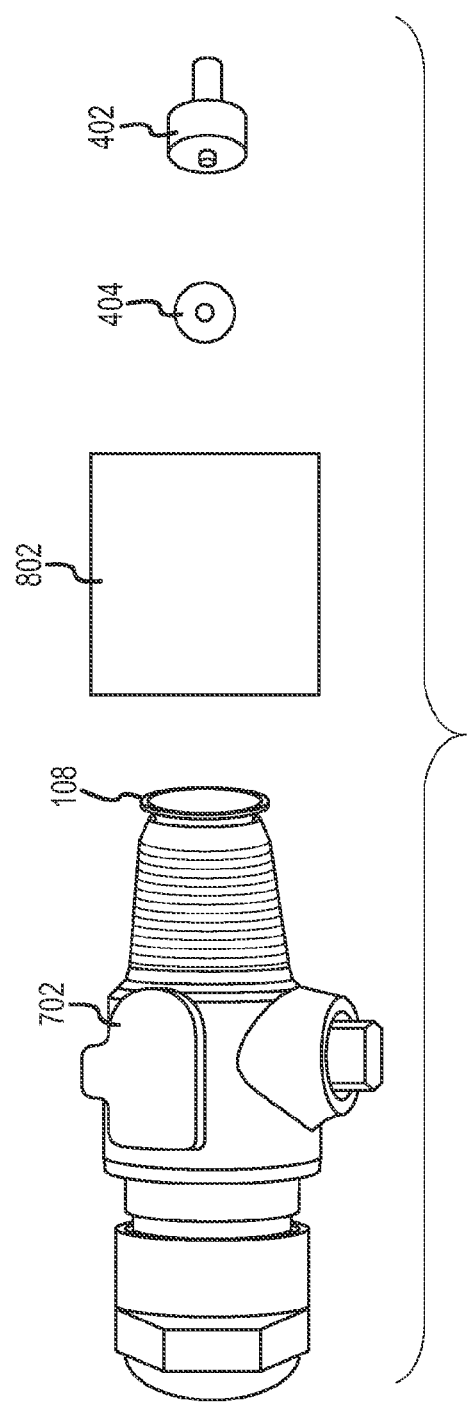

SYSTEM AND METHODS FOR MULTIPLE SERVICE LINE PLUG DEPLOYMENT

CROSS-REFERENCE TO RELATED APPLICATIONS

This application claims the benefit of U.S. Provisional Patent Application Ser. No. 61/289,806, filed on Dec. 23, 2009, which is incorporated herein by reference in its entirety for all purposes.

FIELD

Embodiments of the present invention relate generally to pipeline rehabilitation, and more specifically to locating and restoring service lines in pipeline rehabilitation.

BACKGROUND

After time, pipelines often suffer from corrosion of the inner diameter and/or minor cracking and/or leakage. Such pipelines must often be replaced or rehabilitated. Replacement often involves the movement or destruction of aboveground structures, such as roadways or sidewalks. Rehabilitation, on the other hand, may permit a new inner diameter of the pipe to be created using the existing pipeline as an outer shell, which may eliminate the need to dig up large sections of existing pipeline and/or water mains, and which may involve significant cost savings over replacement. Pipelines have numerous service lines which branch off from the main pipeline.

SUMMARY

Embodiments of the present invention relate to improvements in the locating and restoring of service in fluid bearing pipelines. Embodiments of the present invention include a system for locating and restoring service lines during pipeline restoration. According to some embodiments of the present invention, the system includes a movable cart, a plug with a marking magnet, and an attachment part. In some embodiments of the present invention, the movable cart is deployed along the inside of a pipeline. In some embodiments, the attachment part is movably coupled to the movable cart. The attachment part is configured to install a plug into the service line at a location where the service line intersects the pipeline, according to some embodiments. In other embodiments, the attachment part is configured to mark the location of the plug in the service line and remove the plug from the service line to restore a fluid connection between the service line and the pipeline.

According to embodiments of the present invention, the system has a plug installer which couples with the attachment part. In some embodiments, the plug installer is configured to install a plug into service lines at a location where the service line intersects the pipeline.

According to embodiments of the present invention, the system has a plug locator which couples with the attachment part. In some embodiments, the plug locator is configured to mark the location of a plug by sensing a marking magnet within the plug.

According to embodiments of the present invention, the system has a plug remover which couples with the attachment part. In some embodiments, the plug remover is configured to remove the plug from the service line so as to restore a fluid connection between the service line and the pipeline.

Embodiments of the present invention include a method for locating and restoring service lines during pipeline restoration. According to some embodiments, the method includes: providing a plug with a marking magnet, installing the plug into a service line running off of a pipeline, installing a tubular liner within the pipeline by filling a space between the tubular liner and the pipeline with grout, marking a location for the plug using a plug locator, and removing the plug from the service line to restore a fluid connection between the service line and the pipeline.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 14a illustrates an end section of a service line coupled with a plug, a section of a tubular liner, a movable magnet, and a plug locator, according to embodiments of the present invention.

Figure 1:
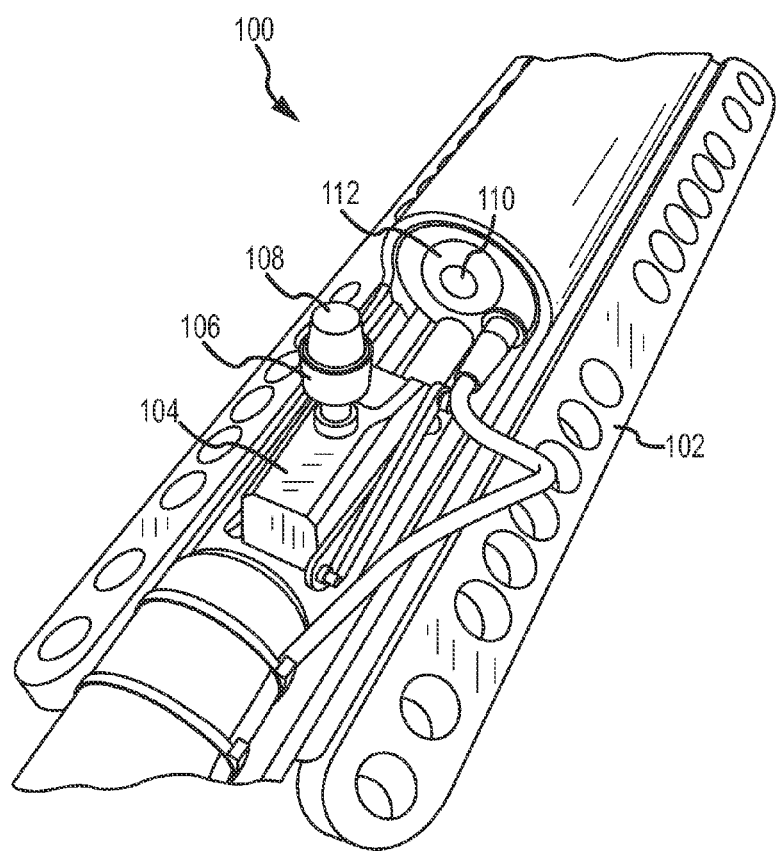
FIG. 1 illustrates a system for locating and restoring service lines during pipeline restoration, according to embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Embodiments of the present invention relate to improvements in the locating and restoring of service lines of fluid-bearing pipelines such as, for example, water mains during pipeline restoration. FIG. 1 illustrates a system 100 for locating and restoring service lines during pipeline restoration, according to embodiments of the present invention. According to embodiments of the present invention, system 100 includes a movable cart 102 and an attachment part 104 associated with the movable cart 102. Attachment part 104 may be coupled with various mechanism and tools which will be later described. According to embodiments of the present invention the system 100 also includes plug installer 106, coupled with attachment part 104, and plug 108. As used herein, the term "coupled" is used in its broadest sense to refer to elements which are connected, attached, and/or engaged, either directly or integrally or indirectly via other elements, and either permanently, temporarily, or removably. As used herein, the term "service line" is used in its broadest sense to refer any type of pipe, hose, line, or other system for fluid or gas movement.

According some embodiments of the present invention, the movable cart 102 is a three axis movable motor assembly positioned on a skid lift mechanism. According to some embodiments, the three axis motor assembly includes a drill with a bit holder and a drill motor. Various attachments may be secured by the bit holder. A chuck or a drill bit holder are exemplary embodiments of attachment part 104, according to which the attachment part may be moved and rotated in three axis of direction. According to embodiments of the present invention, the system 100 also includes a lighting means 112 and a camera 110 such that the movements and location of system 100 may be determined and controlled during use.

Figure 2:
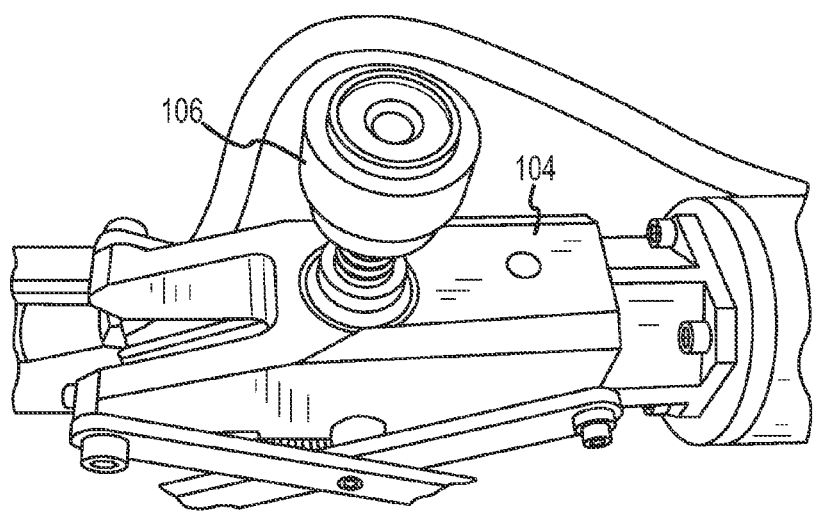
FIG. 2 illustrates an attachment part coupled with a plug installer, according to embodiments of the present invention.

FIG. 2 illustrates a close up view of attachment part 104 which is associated with the movable cart 102, according to embodiments of the present invention. In some embodiments of the present invention, attachment part 104 may be coupled with plug installer 106 as is shown in FIG. 2.

Figure 3:
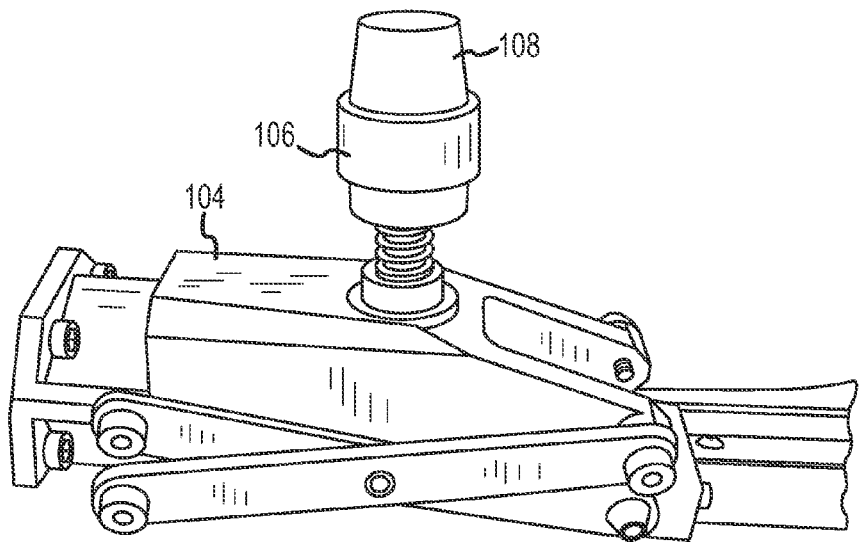
FIG. 3 illustrates an attachment part coupled with a plug installer and a plug, according to embodiments of the present invention.

FIG. 3 is illustrates attachment part 104 coupled with plug installer 106 which is shown with a plug 108, according to embodiments of the present invention. The plug installer, for example, has an attachment side coupled to the attachment part 104 and an upper side configured to retain a plug 108. The upper side of plug installer 106 has a raised circular lip which grips the interior edge of plug 108 such that plug 108 remains on the upper side of plug installer 106 until plug is transferred into a service line 702 (as shown and described with respect to FIGS. 11a-11d, below). According to some embodiments of the invention, plug 108 is a tapered polyethylene plug such as Lawson Products part number 90805 or 90815. Plug 108 may be of various diameters, materials, and shapes such that it is configured to seal service lines of a pipeline at the location where the service lines meet the pipeline. Other embodiments of plug 108 are described below.

Figure 4:
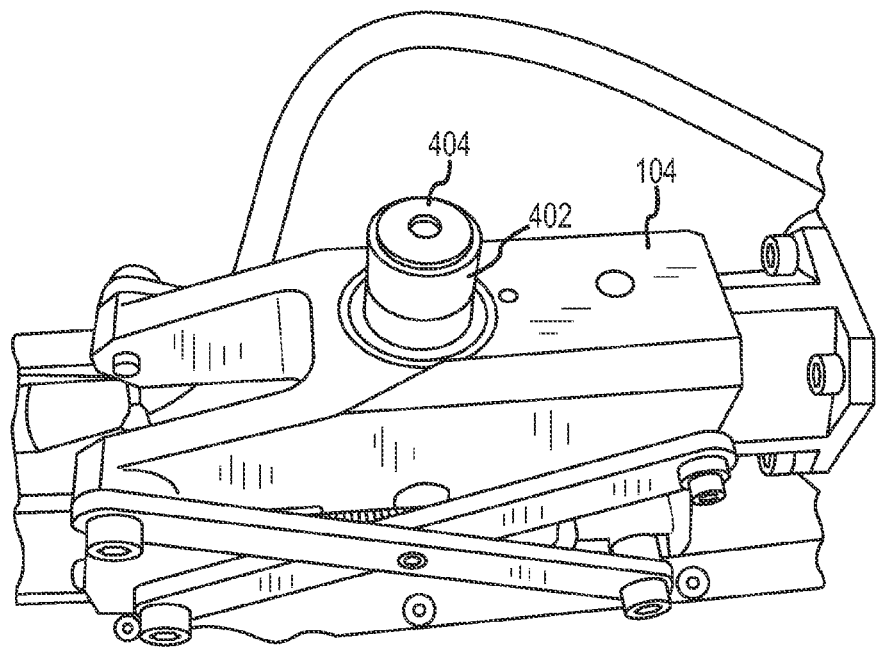
FIG. 4 illustrates an attachment part coupled with a plug locator which is associated with a movable magnet, according to embodiments of the present invention.
Figure 5:
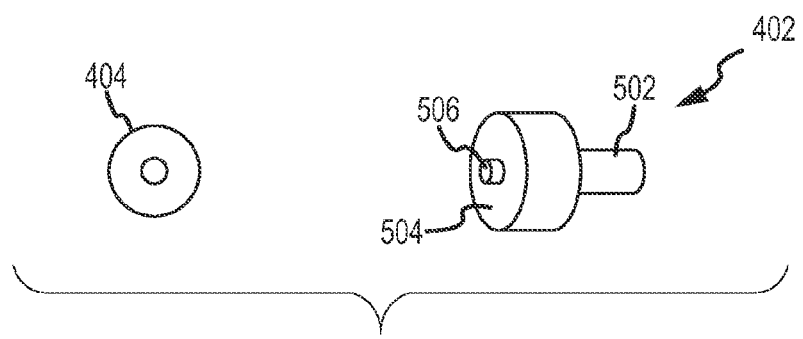
FIG. 5 illustrates a plug locator with a movable magnet separated from the plug locator, according to embodiments of the present invention.

FIG. 4 illustrates plug locator 402 of system 100, where plug locator 402 is coupled with attachment part 104, according to embodiments of the present invention. Plug locator 402 has a movable magnet 404 as shown in FIGS. 4 and 5 which may be used to mark the location of previously installed plugs 108. Other embodiments of plug locator 402 are described below.

Figure 6:
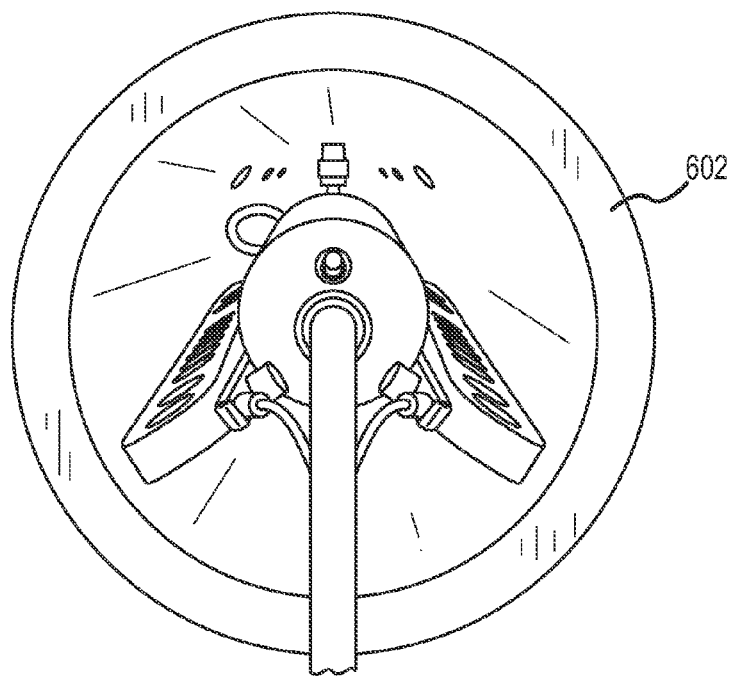
FIG. 6 illustrates a system for locating and restoring service lines during pipeline restoration while the system is on the interior of a pipeline, according to embodiments of the present invention.
Figure 7:
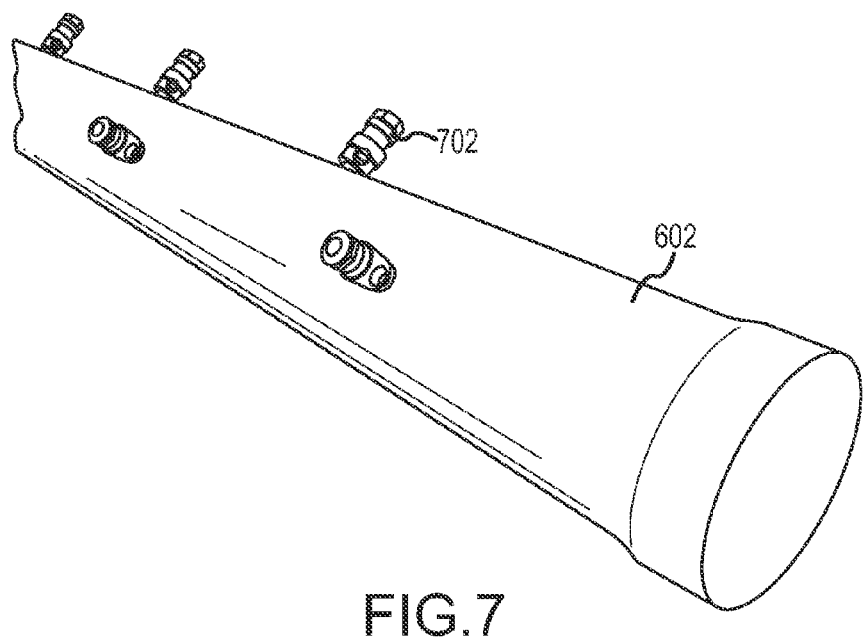
FIG. 7 illustrates the outside of a pipeline having service lines, according to embodiments of the present invention.

FIG. 6 illustrates system 100 deployed along the inside of pipeline 602, according to embodiments of the present invention. FIG. 7 illustrates pipeline 602 with service lines 702 branching off from pipeline 602.

Figure 8:
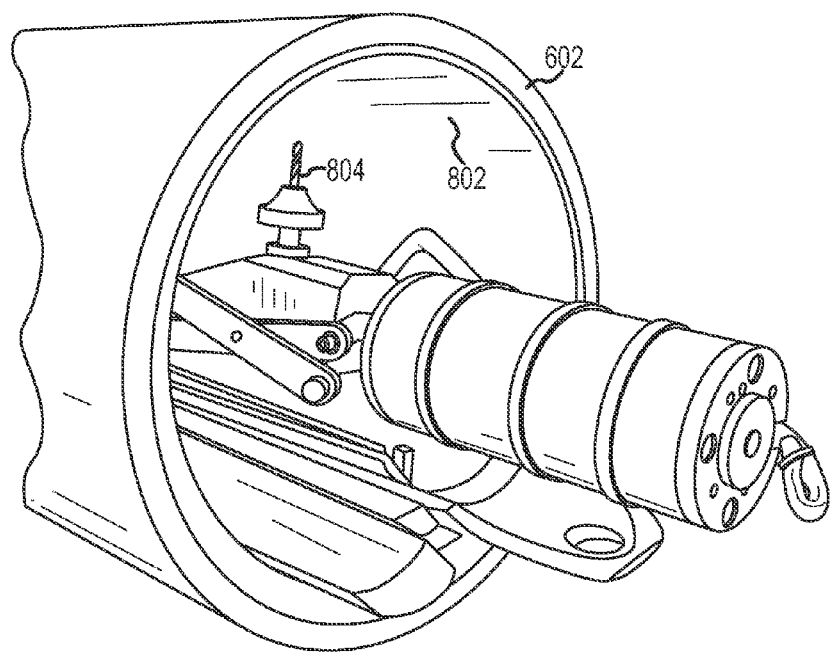
FIG. 8 illustrates a system for locating and restoring service lines during pipeline restoration after a tubular liner is placed within a pipeline, according to embodiments of the present invention.

FIG. 8 illustrates system 100 deployed along the inside of pipeline 602, according to embodiments of the present invention. According to some embodiments of the present invention, plug remover 804 couples with attachment part 104. FIG. 8 also illustrates liner 802, according to embodiments of the present invention. According to embodiments of the present invention, a pipeline 602 may be rehabilitated by inserting a liner 802 therethrough, and cementing the liner 802 to an inside diameter of pipeline 604 with grout. Liner 802 may be, for example, a liner with grout hooks as described in U.S. Pat. No. 6,167,913, issued on Jan. 2, 2001, and entitled "Pipe Liner, a Liner Product and Methods for Forming and Installing the Liner," which is incorporated by reference herein for all purposes. Liner 802 may be formed of an extruded medium-density polyethylene material or other polymer or polymer-like material; for example, liner 802 may be formed from a sheet of material created by Velcro® Europe S.A. According to some embodiments of the present invention, liner 802 conforms to ASTM-D1248: Type 11, Class B, Category 5 standards, and based upon ISO classifications, may be classified as PE-80 or PE-100 material. According to some embodiments of the present invention, liner 802 is substantially resistant to ultraviolet radiation and is designed for potable water applications.

According to some embodiments of the present invention, liner 802 has a tensile strength at breakage of approximately 30 Mpa, an elongation at breakage of approximately 1,100%, a flexural modulus of approximately 700 Mpa, a hardness of approximately 60 Shore D, a Vicat softening point of approximately 126° Celsius, a density at twenty-three degrees Celsius of approximately 942 kilograms per cubic meter, a weight of approximately 450 kilograms per square meter (plus or minus fifty grams per square meter), and a hook concentration of approximately twenty per square centimeter (plus or minus ten percent).

According to embodiments of the present invention, a pipeline 602 may be rehabilitated by inserting a liner 802 therethrough, for example, by the method and system described in U.S. patent application Ser. No. 11/842,933 filed on Aug. 21, 2007, and entitled "Systems and Methods for Pipeline Rehabilitation Installation," which is incorporated by reference herein for all purposes.

According to other embodiments of the present invention, a pipeline 602 may be rehabilitated by inserting a liner 802 therethrough, for example, by the method and system described in U.S. patent application Ser. No. 11/842,937 filed on Aug. 21, 2007, and entitled "Systems and Methods for Installation Inspection in Pipeline Rehabilitation," which is incorporated by reference herein for all purposes.

Figure 9A:
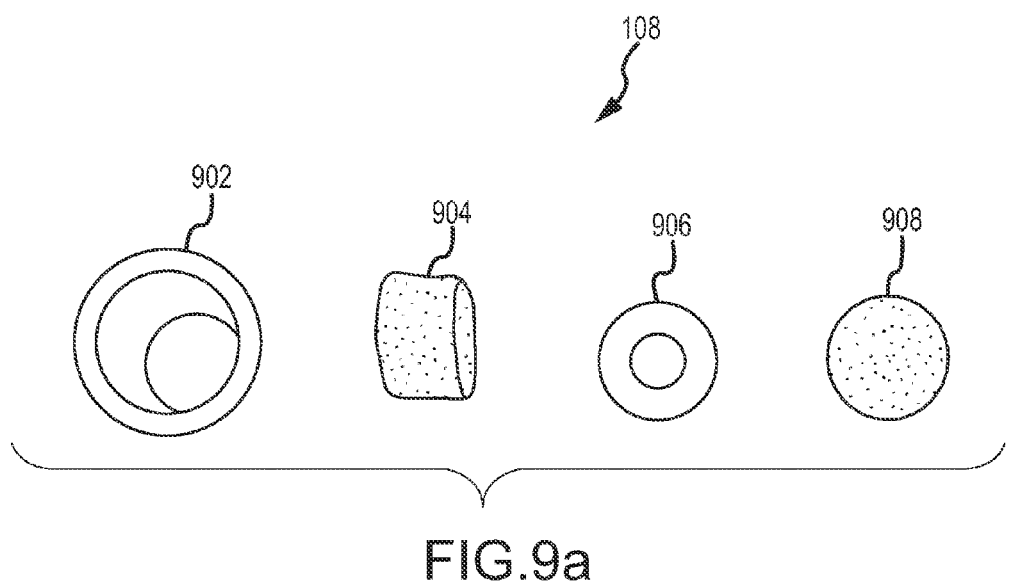
FIG. 9a illustrates parts of an exemplary plug according to embodiments of the present invention.
Figure 9B:
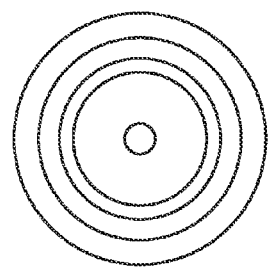
FIG. 9b illustrates an exemplary plug according to embodiments of the present invention.
Figure 9C:
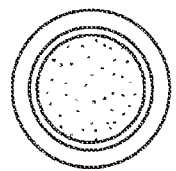
FIG. 9c illustrates an exemplary plug according to embodiments of the present invention.

FIGS. 9a-9c illustrates a plug 108 according to embodiments of the present invention. FIG. 9a shows an exploded view of an exemplary plug 108 which may have a shell 902, a first foam layer 904, a second foam layer 908, and a marking magnet 906. According to embodiments of the invention the shell 902 is hollow and a marking magnet 906 is placed inside the hollow shell. For example, as is shown in FIGS. 9b & 9c, a first foam layer 904 may be placed in the shell 902, then marking magnet 906 may be placed on top of the first foam layer 904, and lastly a second foam layer 908 is placed on top of marking magnet 906. According to embodiments of the present invention the marking magnet 906 may be sealed in plug 108 using a silicon adhesive, or other glue or adhesive. According to embodiments of the present invention, plug 108 may be formed using a Room Temperature Vulcanizer (RTV). The marking magnet may be, for example, a neodymium magnet such as CMS Magnetics part number NR005-40NM.

According to embodiments of the present invention, system 100 may be used to restore service lines 702 during pipeline rehabilitation by installing one or more plugs 108 into the service lines 702 off of the pipeline 602 such that any gap between the service line and the interior space of pipeline 602 is sealed off. Plug 108, for example, may be installed into service lines by coupling plug 108 with plug installer 106 which is in turn coupled with the attachment part 104 of system 100. System 100 may then be deployed within a pipeline 602 to locate service line 702 entrance points into pipeline 602. Movable cart 102 may, for example, locate service lines 702 using lighting means 112 and camera 110. Other locating means may be used such as, for example, an optical, electrical, magnetic, and/or sonar locating means. Movable cart 102 may be moved within pipeline 602. Attachment part 104 may be moved and rotated in three axes of direction to place plug 108 into the opening of service line 702 such that the opening is sealed. According to embodiments of the invention, the plug locator 402 and also the plug remover 804 may be similarly moved and rotated in three axes of direction within the pipeline 602 as described above using the movable cart 102 and the attachment point 104 of system 100.

Figure 10:
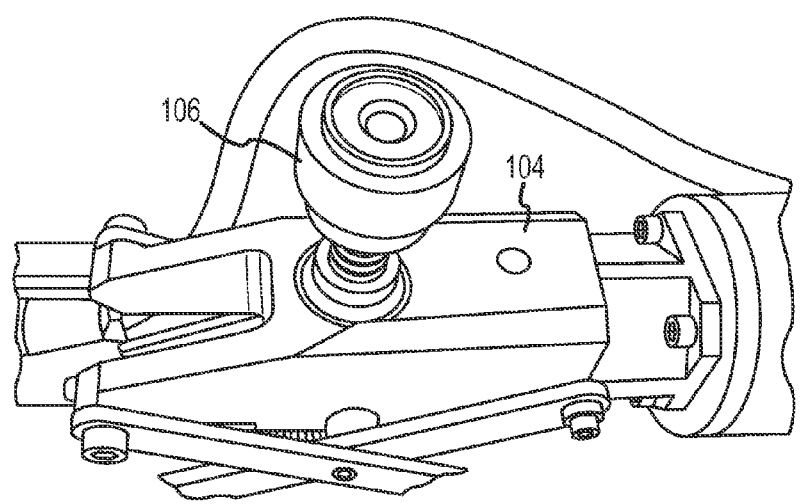
FIG. 10 illustrates a plug installer coupled with an attachment part, according to embodiments of the present invention.
Figure 11A:
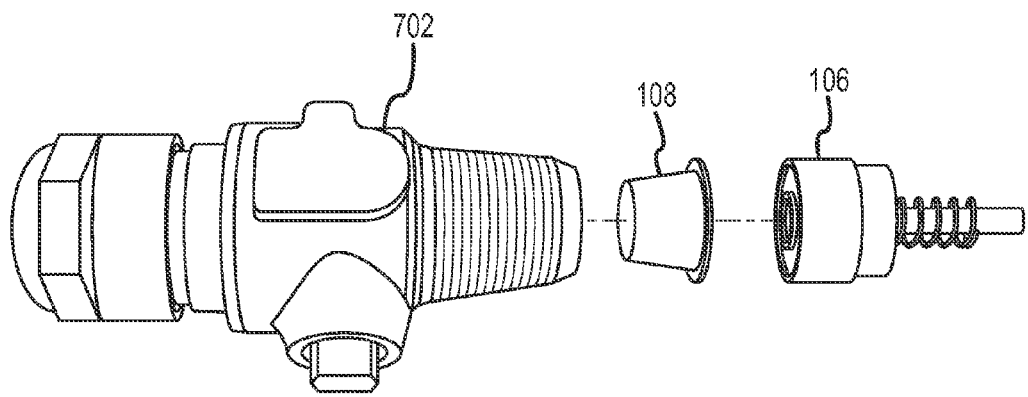
FIG. 11a illustrates an end section of a service line, a plug, and a plug installer, according to embodiments of the present invention.
Figure 11B:
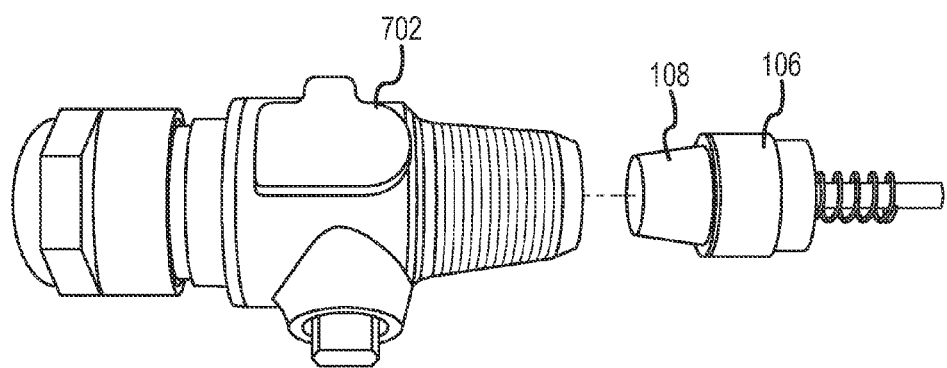
FIG. 11b illustrates an end section of a service line and a plug associated with a plug installer, according to embodiments of the present invention.
Figure 11C:
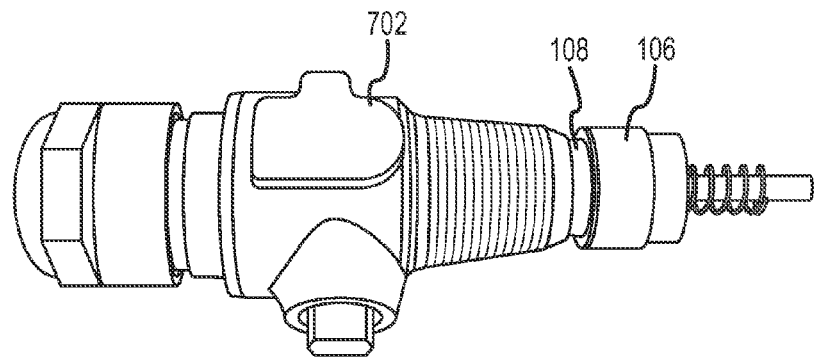
FIG. 11c illustrates a plug which is coupled with both an end section of a service line and a plug installer, according to embodiments of the present invention.
Figure 11D:
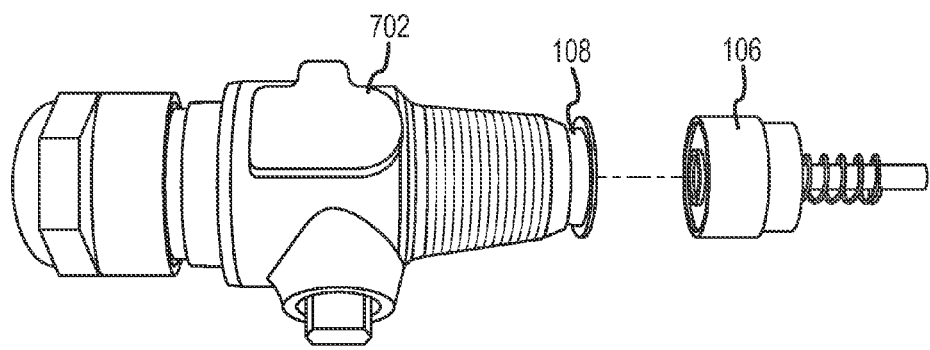
FIG. 11d illustrates a plug installer and a plug coupled with an end section of a service line, according to embodiments of the present invention.

According to embodiments of the present invention, a plug 108 may be installed into a service line 702 using the plug installer 106 coupled to the attachment part 104 as shown in FIG. 10. According to embodiments of the present invention, a plug 108 may be installed into a service line 702 through the steps illustrated in FIGS. 11a-11d in which pipeline 602 and attachment part 106 are omitted for simplification. According to embodiments of the present invention, plug 108 is coupled with plug installer 106 as illustrated in FIG. 11b. Plug is then coupled with the open end of service line 702 such that the opening of the service line to the pipeline 602 (not shown) is sealed as illustrated in FIG. 11c. Plug installer 106 is then moved radially away from open end of service line 702 disengaging plug installer 106 from plug 108 leaving plug 108 coupled with service line 702 as illustrated in FIG. 11d.

According to embodiments of the present invention, after plug 108 is installed into service line 702, the pipeline 602 may be rehabilitated using a liner 802.

According to embodiments of the present invention, the location of plug 108 may be determined using plug locator 402. According to some embodiments of the present invention, the plug locator 402 determines the location of a plug 108 by detecting the location of marking magnet 906 of plug 108 through the installed liner 802. According to embodiments of the present invention, once the location of marking magnet 906 is determined, that location will be marked. The marking of the location of magnet 906 may be accomplished by, for example but not limited to: creating a dimple or indent in the liner 702 with plug locator 402; creating a visual marking with pen, pencil, or marker; or leaving a separate magnet at the location magnetically engaged with marking magnet 906.

Figure 12A:
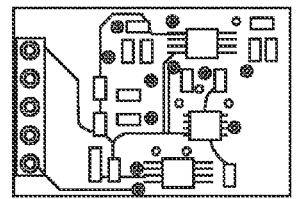
FIG. 12a illustrates an electromagnetic sensor, according to embodiments of the present invention.
Figure 12B:
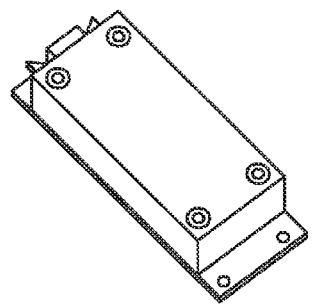
FIG. 12b illustrates an electromagnetic sensor, according to embodiments of the present invention.
Figure 12C:
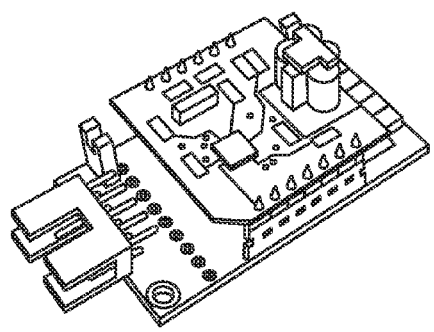
FIG. 12c illustrates an electromagnetic sensor, according to embodiments of the present invention.
Figure 13A:
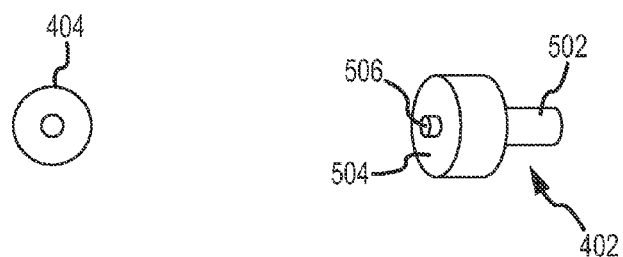
FIG. 13a illustrates a movable magnet and a plug locator, according to embodiments of the present invention.
Figure 13B:
FIG. 13b illustrates a movable magnet coupled with a plug locator, according to embodiments of the present invention.

According to some embodiments of the present invention, the plug locator has an electromagnetic sensor as shown in FIGS. 12a-12c which may be used to locate marking magnet 906 of plug 108. For example, FIG. 12a illustrates a PNI Corporation's MicroMag3 integrated three-axis magnetic field sensing module, FIG. 12b illustrates a Honeywell HMC1052L magnetic sensor, and FIG. 12c illustrates a Honeywell HMR2300 three-axis digital magnetometer.

According to some embodiments of the present invention, the plug locator 402 may include a movable magnet 404 as is illustrated in FIGS. 4, 5, 13a, and 13b. For example, the plug locator 402 may have an attachment side 502 coupled with attachment part 104 and an upper side 504 configured to engage movable magnet 404. In one embodiment the upper side of plug locator 402 has a central raised bump 506 configured to engage a hole in the center of movable magnet 404. According to embodiments of the present invention the movable magnet 404 and the plug locator 402 may be magnetically coupled, or may be nonmagnetically coupled.

Figure 14B:
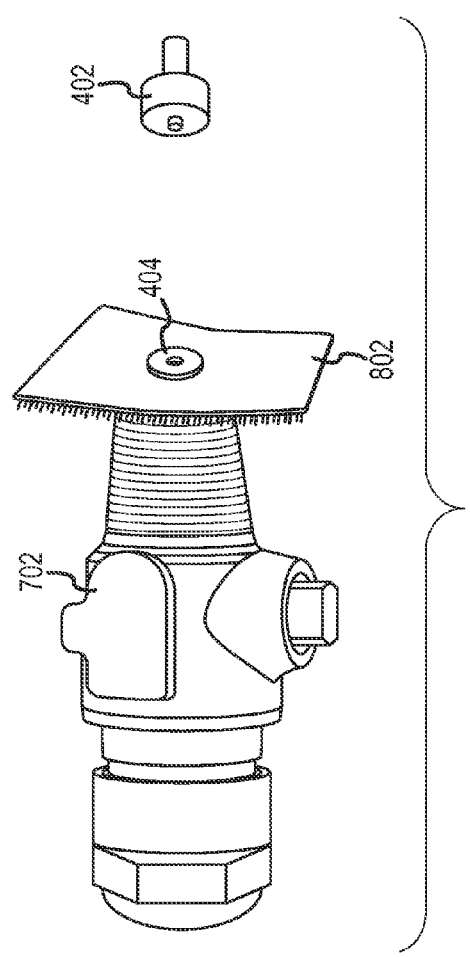
FIG. 14b illustrates an end section of a service line coupled with a plug, and a movable magnet magnetically coupled with the plug with a section of tubular liner between the plug and the movable magnet, according to embodiments of the present invention.

FIG. 14a illustrates a plug locator 402, movable magnet 404, liner 802, and a plug 108 inserted inside the opening of service pipe 702, according to embodiments of the present invention. According to embodiments of the invention, after the liner 802 has been installed within the pipeline 602 as described above, the location of a plug 108 may be determined by moving the movable magnet 404 which is coupled with plug locater 402 around the interior volume of pipe 702. The plug locater 402 may be moved while coupled to the attachment part 104 through movement of the movable cart 102. According to embodiments of the present invention as the plug locater 402 passes by a plug 108 under the liner 802, the movable magnet 404 will disengage from the plug locater 402 and magnetically engage with marking magnet 906 which is located within plug 108. The engagement of marking magnet 906 and plug locater 402 is illustrated in FIG. 14*b*. Multiple marking magnets 906 may be used to mark the location of multiple plugs 108.

According to embodiments of the present invention, after the location of one or more plugs 108 is determined and marked, the one or more plugs 108 are removed from the service lines 702 using plug remover 804. The plug remover 804 may be moved to the location of plugs 108, for example, through the use of movable cart 102, camera 110 and lighting means 112 to determine the marked locations of plugs 108.

Figure 15A:
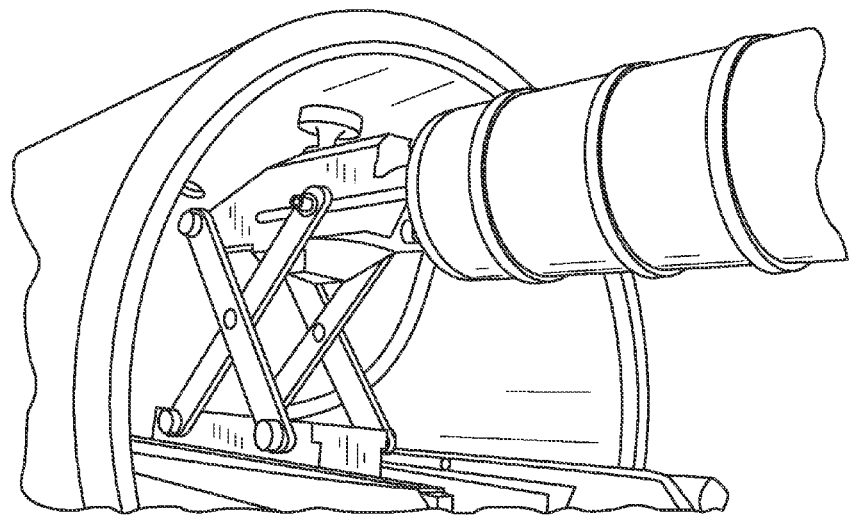
FIG. 15a illustrates a system for locating and restoring service lines during pipeline restoration with a plug remover drilling a hole through a tubular liner into a service line, according to embodiments of the present invention.
Figure 15B:
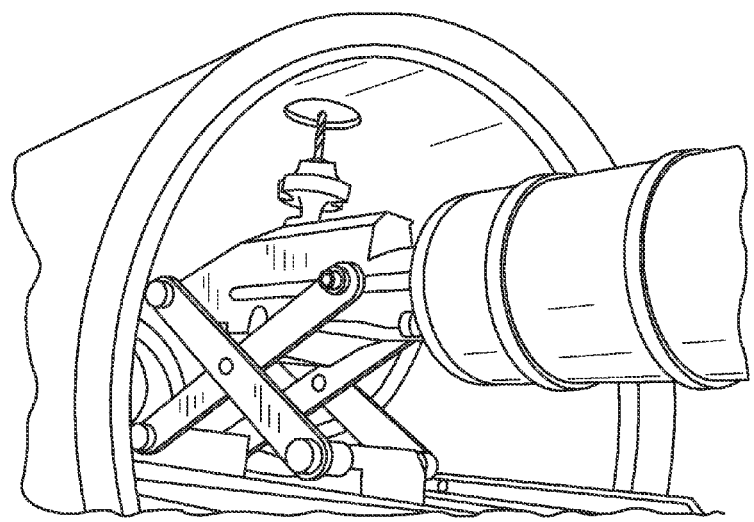
FIG. 15b illustrates a system for locating and restoring service lines during pipeline restoration after a plug remover has drilled a hole through a tubular liner into a service line, according to embodiments of the present invention.
Figure 15C:
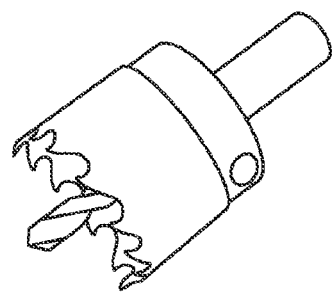
FIG. 15c illustrates an embodiment of a plug remover.

According to embodiments of the present invention, plug remover 804 may be coupled with attachment part 104. Attachment part 104 may be, for example, a drill bit holder which permits the attachment part 104 to move and rotate in three axes of direction. An exemplary plug remover 804 may be a drill bit, such as, but not limited to: a circular drill bit, a circular drill bit with a centering device which may drill through a hole in movable magnet 404, and/or the drill bit illustrated in FIGS. 15*a* & 15*b*. FIG. 15*c* illustrates an embodiment of plug remover 804.

According to embodiments of the present invention, plug remover 804 cuts through the liner 802 and the plug 108 such that an opening is created between the interior of the pipeline 602 and the interior of service lines 702. After the opening is created as is shown in FIG. 15*b*, the plug falls through the opening due to gravity, according to embodiments of the present invention. According to other embodiments of the invention, the plug is removed from the opening by having a plug remover magnet attached to plug remover 804 which magnetically couples to plug 108, specifically marking magnet 906, such that as the plug remover is pulled out of the opening, the plug 108 will also be magnetically coupled to plug remover 804 and be removed from the opening simultaneously with the plug remover 804.

Figure 16:
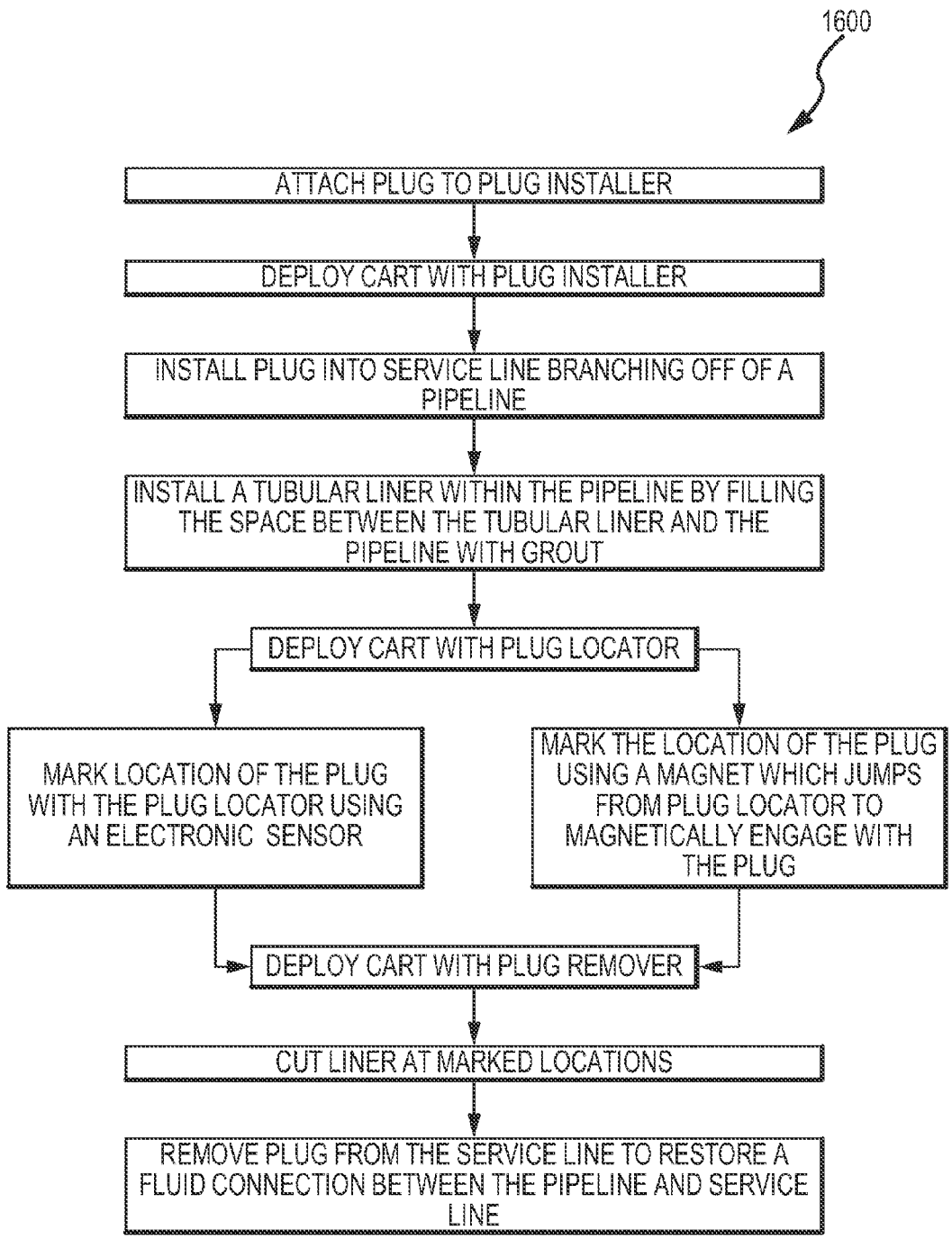
FIG. 16 illustrates a method for locating and restoring service lines during pipeline restoration, according to embodiments of the present invention.

FIG. 16 depicts a flow diagram 1600 illustrating a method for locating and restoring service lines in pipeline rehabilitation, according to embodiments of the present invention. A movable cart 102 may be deployed with a pipeline 602. One or more plugs 108 may be installed into service lines 702 branching from a pipeline 602. A tubular liner 802 may be installed within pipeline 602 by filling the space between the tubular liner 802 and the pipeline 602 with grout. The movable cart 102 may then be deployed with a plug locator 402. The location of plugs 108 may be marked using a plug locator 402 and a movable magnet 404. The location of the plugs may be marked using a plug locator 402 and an electronic sensor. After the plugs 108 have been marked, the movable cart 102 may then be deployed with plug remover 804. The tubular liner 802 may then be cut at the marked locations. The plugs 108 may be removed from the service lines 702 to restore a fluid connection between the pipeline 602 and service line 702, according to embodiments of the present invention.

Figure 17:
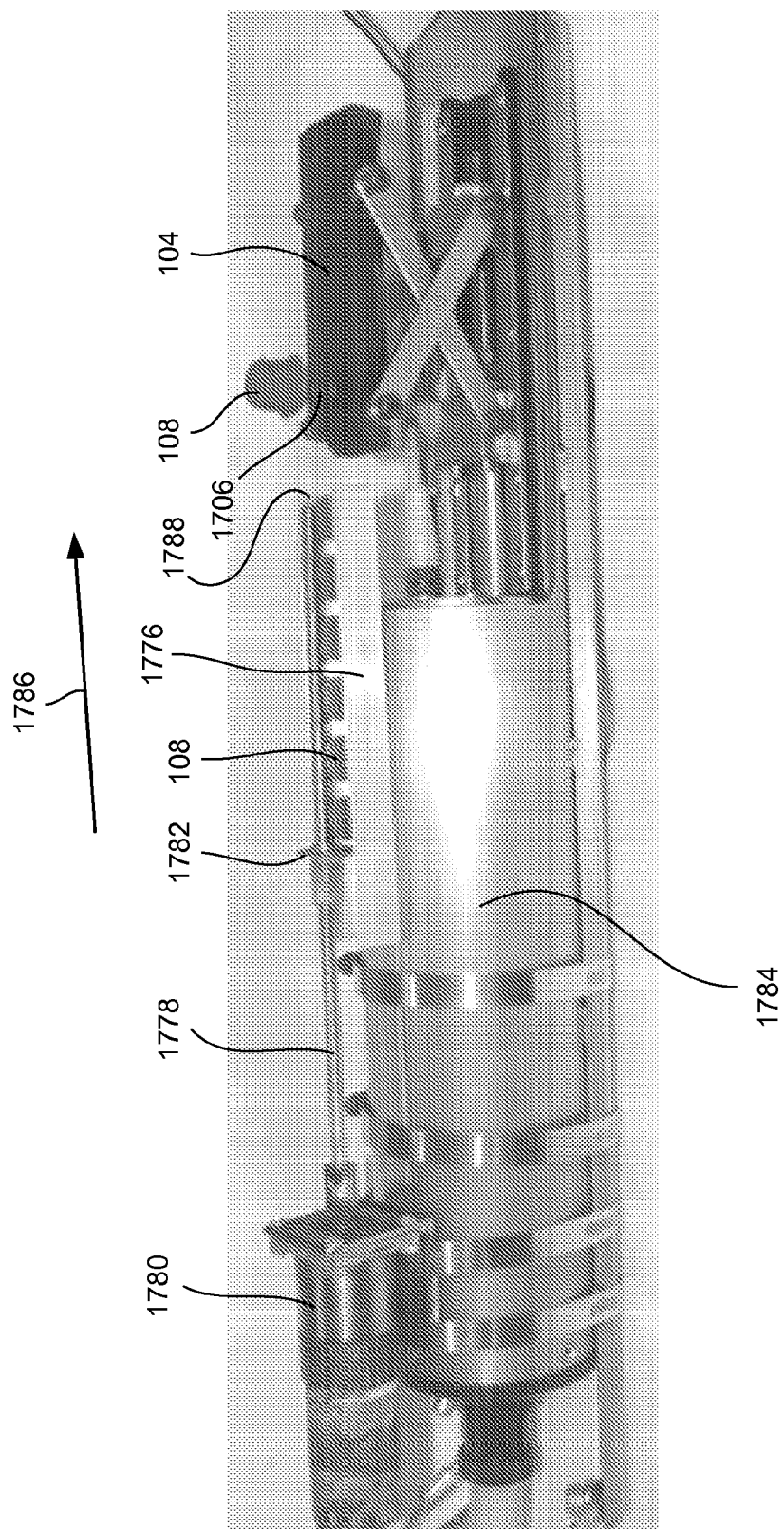
FIG. 17 illustrates a perspective view of a multiple service line plug deployment system, according to embodiments of the present invention.
Figure 18:
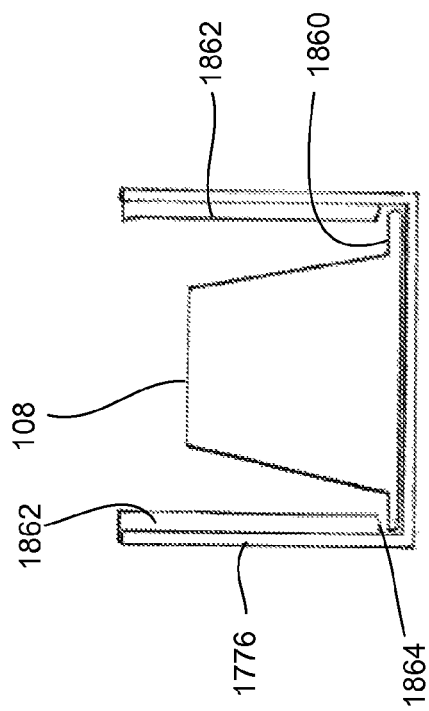
FIG. 18 illustrates a front elevation view of the service line plug magazine tray of FIG. 17, according to embodiments of the present invention.

According to embodiments of the present invention, a single plug 108 is placed on plug installer 106, the plug is installed within a service line opening, and the cart 102 is withdrawn from the pipeline 602. Such a method can sometimes result in large amounts of time incurred to reload the plug installer 106 with a plug 108. FIG. 17 illustrates a plug magazine tray 1776 mounted to the cylinder 1784 of cart 102, according to embodiments of the present invention. The plug magazine tray 1776 holds multiple plugs 108 so that the cart 102 need not be withdrawn from the pipeline 602 in between each plug installation. FIG. 18 illustrates a front elevation view of the tray 1776 with a plug 108 mounted therein. The tray 1776 may be constructed of folded aluminum sheet metal, for example. Plug 108 includes a lip 1860 or protrusion. Side elements 1862 may be added to the inner sides of the tray 1776 as shown, to create a channel 1864 into which the lip 1860 protrudes on each side. The channels 1864 help retain the plugs 108 within the tray 1776 while permitting the plugs to slide along the length of the tray 1776, according to embodiments of the present invention. Based on the disclosure provided herein, one of ordinary skill in the art will recognize numerous other ways in which a similar channel 1864 may be formed.

A motor 1780, such as, for example, a gear motor, may also be mounted on cylinder 1784. Motor 1780 is coupled with shaft 1778, which may also be referred to as a forcing screw or drive screw. An advancing member 1782 is coupled with the shaft 1778. The motor 1780, drive screw 1778, and/or advancing member 1782 may be referred to as a plug actuation mechanism, and more specifically a plug advancement mechanism, according to embodiments of the present invention. According to embodiments of the present invention, the outer surface of the shaft 1778 is threaded, and the advancing member 1782 includes an inner bore formed therethrough having an inner surface that is threaded to correspond with and to engage the outer surface of the shaft 1778. Rotating the shaft 1778 in one direction thus causes the advancing member 1782 to move in the direction indicated by arrow 1786, thereby pushing the row of plugs 108 toward the exit end 1788 of the tray 1776. The motor 1780 may thus be turned on and off, and/or turned on for predetermined bursts of time, to selectively push an additional plug 108 off of the tray 1776, according to embodiments of the present invention. Based on the disclosure provided herein, one of ordinary skill in the art will appreciate the numerous other ways that the plugs 108 may be advanced in the direction indicated by arrow 1786. For example, instead of a shaft 1778/motor 1780 system, a spring or other biasing element may be used to bias or push the plugs 108 in direction 1786, and a crank, latch, and/or trigger mechanism may be used to selectively release one plug 108 at a time, according to embodiments of the present invention.

As each plug 108 is pushed off of the tray 1776, it is temporarily and removably retained by a plug installer 1706, which is in turn mounted to the attachment part 104 of the cart 102. Because the attachment part 104 is capable of moving both towards and away from the inner diameter of the pipeline 602 (e.g. by operation of the scissor lift shown in FIG. 17, which also slides back and forth along direction 1786), and because the cart 102 is also capable of rotation within the pipeline 602 to place the platform 104 and thus the plug 108 at a desired angular orientation, the platform 104 may be used to align the plug 108 with a service line opening and push the plug 108 into the service line opening. The plug installer 1706 may then be returned to a position just in front of and under the exit end 1788 of the tray 1776, to receive the next plug 108 pushed out by the advancing member 1782, according to embodiments of the present invention.

Figure 19:
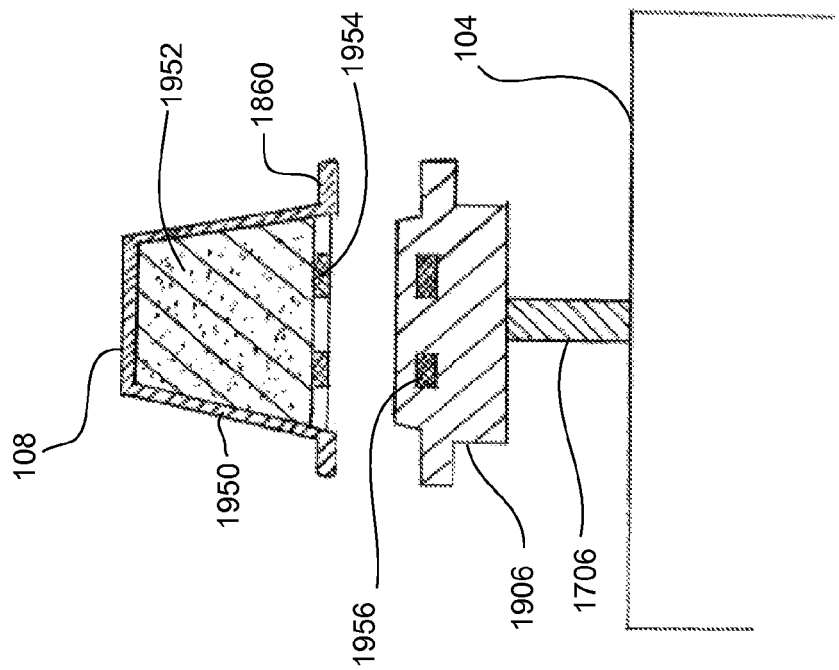
FIG. 19 illustrates a front cross-sectional view of a plug and plug installer, according to embodiments of the present invention.

While FIG. 17 illustrates one embodiment of a plug installer as a simple threaded shaft 1706, FIG. 19 illustrates an alternative plug installer 1906, according to embodiments of the present invention. Plug installer 1906 is coupled to shaft 1706 which is coupled to attachment part 104, according to embodiments of the present invention. As described above, the plug 108 may be constructed of a plastic outer shell 1950, and may include one or more foam filling layers 1952 or the like, as well as a magnet 1954 in the plug 108, according to embodiments of the present invention. As described above, the magnet 1954 assists in locating the plug 108 after installation of the liner within the pipeline 602 and over the plug 108, according to embodiments of the present invention.

The plug installer 1906 may include a magnet 1956 embedded therein; for example, the plug installer 1906 may be made of aluminum, and the magnet 1956 and/or magnetic material may be embedded therein in order to help retain the plug 108 on the plug installer 1906 before and during installation, according to embodiments of the present invention. The magnet 1956 and/or magnetic material may be embedded deep enough within the plug installer 1906, and/or the strength of the magnets may be selected, such that the magnetic force between magnet 1954 and magnet 1956 is sufficient to cause the plug 108 to be attracted to and/or retained by the plug installer 1906 as the plug 108 comes off of the tray 1776, while being insufficient to overcome the pressure fit forces between the plug 108 and the pipeline 602 after the plug 108 has been inserted in a service line, thereby permitting withdrawal of the plug installer 1906 from the installed plug 108, according to embodiments of the present invention. According to embodiments of the present invention, the plug installer 1906 includes lips, ridges, and/or surface features that engage with and/or interlock with corresponding features on the plug 108 to further retain plug 108 on plug installer 1906 prior to installation.

Figure 20:
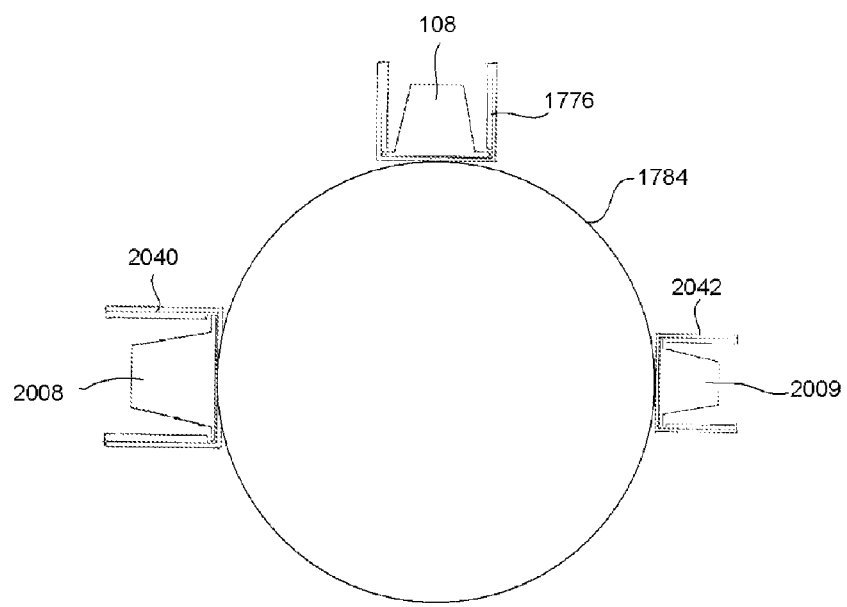
FIG. 20 illustrates a front cross-sectional view of the system of FIG. 17, including multiple plug magazine trays, according to embodiments of the present invention.

FIG. 20 illustrates that additional plug magazine trays 2040, 2042 may be mounted on cylinder 1784, and the ability of the cart 102 to rotate the plug installer 1906 to a desired angular orientation permits the plug installer 1906 to take a plug 108 from a selected one of the trays 1776, 2040, 2042, according to embodiments of the present invention. Additional trays 2040, 2042 may be used to hold additional plugs 108 of the same size, and/or may be used to hold plugs 2008, 2009 of different sizes. For example, plugs 2009 may be ½ inch plugs, plugs 108 may be ⅝ inch plugs, and plugs 2008 may be ¾ inch plugs, according to embodiments of the present invention. According to embodiments of the present invention, each tray 1776, 2040, 2042 may have its own motor 1780, shaft 1778, and/or advancing member 1782 to selectively load a particular size plug 108, 2008, 2009 onto the plug installer 1906.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A system for locating and restoring service lines in pipeline rehabilitation, the system comprising:
   a movable cart configured for deployment along an inside of a pipeline;
   a plurality of plugs, wherein each of the plurality of plugs is configured to be installed into a service line at a location where the service line intersects the pipeline;
   a tray removably retaining the plurality of plugs; and
   a plug actuation mechanism configured to release the plurality of plugs from the tray one at a time,
   wherein the plug actuation mechanism is a plug advancement mechanism configured to release the plurality of plugs from the tray one at a time by sliding the plurality of plugs along the tray in a direction that is substantially parallel to a centerline of the pipeline.

2. The system of claim 1, wherein the plug advancement mechanism comprises a drive screw and an advancing member threadably coupled with the drive screw, the advancing member configured to push the plurality of plugs along the tray with rotation of the drive screw.

3. The system of claim 2, further comprising a motor configured to rotate the drive screw.

4. The system of claim 1, wherein each of the plurality of plugs comprises a lip, and wherein the tray comprises one or more channels configured to removably retain the plurality of plugs by receiving the lip of each of the plurality of plugs.

5. The system of claim 4, wherein the tray extends longitudinally between a first end and a second end, and wherein the one or more channels permit the plurality of plugs to slide along the tray in a first direction from the first end toward the second end, and substantially prevent release of the plurality of plugs from the tray in a second direction substantially orthogonal to the first direction.

6. The system of claim 1, wherein each of the plurality of plugs comprises a magnet.

7. The system of claim 1, further comprising:
   an attachment part movably coupled with the movable cart, wherein the attachment part is configured to install the plug into the service line at the location, and wherein the attachment part is configured to remove the plug from the service line and to restore a fluid connection between the service line and the pipeline.

8. The system of claim 7, wherein each of the plurality of plugs comprises a marking magnet, and wherein the attachment part comprises an attachment magnet, wherein the attachment part is configured to removably engage each of the plurality of plugs with attraction of the marking magnet to the attachment magnet.

9. The system of claim 8, wherein the attachment part is configured to removably engage each of the plurality of plugs solely with attraction of the marking magnet to the attachment magnet.

10. The system of claim 7, wherein each of the plurality of plugs comprises a threaded bore, and wherein the attachment part comprises a threaded protrusion, wherein the attachment part is configured to removably engage each of the plurality of plugs with an at least partial threading of the threaded protrusion into the threaded bore.

11. The system of claim 1, wherein the tray is a first tray, wherein the plurality of plugs is a first plurality of plugs, and wherein the plug actuation mechanism is a first plug actuation mechanism, the system further comprising:
   a second plurality of plugs; and
   a second tray removably retaining the second plurality of plugs; and
   a second plug actuation mechanism configured to release the second plurality of plugs from the second tray one at a time.

12. The system of claim 11, wherein each of the first plurality of plugs has a first size, and wherein each of the second plurality of plugs has a second size different from the first size.

13. The system of claim 11, further comprising:
   a third plurality of plugs;
   a third tray removably retaining the third plurality of plugs; and
   a third plug actuation mechanism configured to release the third plurality of plugs from the third tray one at a time.

14. A system for locating and restoring service lines in pipeline rehabilitation, the system comprising:
   a movable cart configured for deployment along an inside of a pipeline;

a plurality of plugs, wherein each of the plurality of plugs is configured to be installed into a service line at a location where the service line intersects the pipeline;

a tray removably retaining the plurality of plugs;

a plug actuation mechanism configured to release the plurality of plugs from the tray one at a time; and an attachment part movably coupled with the movable cart, wherein the attachment part is configured to install the plug into the service line at the location, and wherein the attachment part is configured to remove the plug from the service line and to restore a fluid connection between the service line and the pipeline.

15. The system of claim 14, wherein each of the plurality of plugs comprises a marking magnet, and wherein the attachment part comprises an attachment magnet, wherein the attachment part is configured to removably engage each of the plurality of plugs with attraction of the marking magnet to the attachment magnet.

16. The system of claim 15, wherein the attachment part is configured to removably engage each of the plurality of plugs solely with attraction of the marking magnet to the attachment magnet.

17. The system of claim 14, wherein each of the plurality of plugs comprises a threaded bore, and wherein the attachment part comprises a threaded protrusion, wherein the attachment part is configured to removably engage each of the plurality of plugs with an at least partial threading of the threaded protrusion into the threaded bore.

18. A system for locating and restoring service lines in pipeline rehabilitation, the system comprising:

a movable cart configured for deployment along an inside of a pipeline;

a plurality of plugs, wherein each of the plurality of plugs is configured to be installed into a service line at a location where the service line intersects the pipeline;

a tray removably retaining the plurality of plugs;

a plug actuation mechanism configured to release the plurality of plugs from the tray one at a time, wherein each of the plurality of plugs comprises a lip, and wherein the tray comprises one or more channels configured to removably retain the plurality of plugs by receiving the lip of each of the plurality of plugs, wherein the tray extends longitudinally between a first end and a second end, and wherein the one or more channels permit the plurality of plugs to slide along the tray in a first direction from the first end toward the second end, and substantially prevent release of the plurality of plugs from the tray in a second direction substantially orthogonal to the first direction.

* * * * *